US005538784A

United States Patent [19]
Subramanian

[11] Patent Number: 5,538,784
[45] Date of Patent: Jul. 23, 1996

[54] PROCESS FOR MOLDING FIBER-REINFORCED THERMOPLASTIC POLYMER ARTICLES

[75] Inventor: Pallatheri M. Subramanian, Hockessin, Del.

[73] Assignee: E. I. Du Pont de Nemours and Company, Wilmington, Del.

[21] Appl. No.: 302,778

[22] PCT Filed: Mar. 25, 1992

[86] PCT No.: PCT/US92/02142

§ 371 Date: Sep. 21, 1994

§ 102(e) Date: Sep. 21, 1994

[87] PCT Pub. No.: WO93/18900

PCT Pub. Date: Sep. 30, 1993

[51] Int. Cl.$^6$ .................................................. B29C 45/00
[52] U.S. Cl. ........................ 428/283; 264/109; 264/122; 428/288
[58] Field of Search .................................. 264/122, 109; 428/288, 283

[56] References Cited

U.S. PATENT DOCUMENTS 3,732,345  5/1973  Amos et al. ............................ 264/329

FOREIGN PATENT DOCUMENTS

68872/74  9/1974  Australia.
1159230  7/1969  United Kingdom.

OTHER PUBLICATIONS

G. Owerfeldt and M. Kurz, Markgroningen, Drying Plastic Granulates with Dehumidified Air, *2376 Kunststoffe [Plastics]*, 78 (1988) Apr. No. 4, No. 4:318–22, Apr. 1988.

D. Kompalik, Meitingen and B. Schmid, Injection Molding of Carbon–Fiber Reinforced Polycarbonate, *2376 Kunststoffe [Plastics]*, 78 (1988) Apr. No. 4, No. 4:308–11, Apr. 1988.

Masanobu Motoyoshi and Minoru Takada, Processing of Thermoplastic Composites (Part I), *2282 Japan Plastics Age*, 20 (1982) Sep.–Oct. 187, B2gB13/06B, Sep.–Oct. 1982.

*Primary Examiner*—Mary Lynn Theisen
*Attorney, Agent, or Firm*—Rodney B. Carroll

[57]  ABSTRACT

Inorganic fiber-reinforced thermoplastic articles are produced from precisely proportioned feed mixtures of particles of thermoplastic polymer, a polymer modifier and inorganic fiber bundles supplied, under specified conditions, directly to an injection molding apparatus. The articles exhibit exceptionally superior heat deflection temperature compared to articles produced from feeds which are precompounded prior to injection molding.

10 Claims, No Drawings

5,538,784

PROCESS FOR MOLDING FIBER-REINFORCED THERMOPLASTIC POLYMER ARTICLES

BACKGROUND OF THE INVENTION

This invention relates to a process to produce molded articles of thermoplastic polymer reinforced with inorganic fiber and having excellent physical properties, especially high heat deflection temperature.

In conventional injection molding processes for making fiber-reinforced, thermoplastic polymer articles, raw material is supplied to the molding machine as pellets made by a precompounding process. The precompounded pellets are composed of thermoplastic polymer, reinforcement fiber and other ingredients including, for example, stabilizers, pigments, processing aids, modifiers and fillers. The precompounding step provides all the ingredients to the molding operation in proper proportion in convenient form and does not require handling them individually. It also disperses the ingredients for effectiveness in the article produced by the subsequent molding step. Precompounding does, however, add significantly to overall molded article production cost because it requires a second melting of the materials, isolation of pelletized intermediate product with attendant cost for yield loss and packaging, and usually a second drying operation before precompounded pellets are fed to the molding machine. Mixing during precompounding also causes fiber comminution to shorter length than was fed to the precompounding apparatus. Short fibers impart inferior physical properties, such as stiffness measured by flexural modulus and heat resistance measured by heat deflection temperature, than do long fibers. Because the precompounding step requires processing in the melt phase, matrix polymer is necessarily exposed to high temperatures and is subject to thermal degradation.

Sometimes polymer modifiers which are incompatible with the matrix polymer, such as toughening agents to improve impact resistance of the molded article, are added. Intensive mixing is required to disperse the agents in the matrix polymer. Unfortunately, intensive melt mixing also causes comminution of the reinforcement fibers.

If the ingredients of the composition could be fed to the molding machine directly, it would be possible to avoid the adverse performance effects and increased costs of operating the precompounding step. However, when chopped glass fiber bundles are conveyed and fed to injection molding machines together with un-precompounded thermoplastic polymer compositions, problems are often encountered. One problem is that the fiber bundles segregate from the pellet resin because of bulk density, and flow characteristics. Another problem is that the fiber bundles break apart during transport to the molding machine and produce fluffy agglomerates sometimes called "fuzzballs", which obstruct material flow and produce molded article defects. The result of these problems is that the molding process is frequently upset, dispersion of modifiers, reinforcement fiber and other ingredients in the matrix polymer is nonuniform and physical properties of the molded articles are inferior and inconsistent.

In U.S. Pat. No. 3,644,271, Tulley discloses an injection molding process in which the feeds are 20–40 wt % thermoplastic powder of 30–200 mesh size, 40–60 wt % thermoplastic pellets and about 20 wt % glass fibers. This process requires that a portion of the thermoplastic polymer is ground to a fine powder.

U.S. Pat. No. 3,732,345 to Amos et at. discloses alternative processes for incorporating filamentary reinforcing agent into thermoplastic resinous material. In one embodiment disclosed in the patent, chopped fibers and particulate resin are fed to the throat of the injection molding machine by being carefully deposited in separate layers on a conveyor. In other embodiments, the reinforcement agent and thermoplastic material are fed as separate streams to the molding machine throat. Amos does not explain how his methods overcome the above-mentioned problems.

In "Injection Molding of Carbon-Fiber Reinforced Polycarbonate" 0.2376 Kunststoffe 78 (1988), Kompalik et al. disclose an injection molding process using carbon fibers in polycarbonate resin as a two-component system. The fibers were specially pre-treated for adherence in polycarbonate.

It is desirable to provide a cost effective injection molding process for producing inorganic fiber-reinforced, thermoplastic polymer, consistent quality shaped articles having superior heat deflection temperature without having to resort to a precompounding step.

SUMMARY OF THE INVENTION

According to the present invention, there is now provided a process for the direct fabrication of fiber-reinforced injection molded articles having a high heat deflection temperature, comprising:

(1) providing components comprising
   (A) particles of at least one thermoplastic polymer;
   (B) particles of a polymer modifier for the thermoplastic polymer; and
   (C) inorganic fiber bundles of length from 1.5 to 13 mm;
(2) drying the thermoplastic polymer and modifier to a moisture content which prevents hydrolyric degradation of a predominant fraction of the thermoplastic polymer upon exposure to a temperature of up to 300° C.;
(3) maintaining the thermoplastic polymer and modifier in the state of dryness substantially the same as that attained in step (2);
(4) providing separate portions of each of thermoplastic polymer, modifier and inorganic fiber bundles such that inorganic fiber bundles are from 10 to 60 wt % of the total;
(5) combining the separate portions into a dry blend and blending at such intensity that the inorganic fiber bundles retain their integrity, for a sufficient duration to cause the dry blend to have a uniform concentration;
(6) feeding the dry blend to an injection molding machine; and
(7) molding the dry blend to produce molded articles.

There are also provided molded articles produced by the direct fabrication process.

DETAILED DESCRIPTION OF THE INVENTION

The term "dry blend" means a solid phase, mixture of particulate components prepared by mechanical agitation such that particles of the individual components substantially retain their respective shapes as supplied to the mixing process.

The term "direct fabrication" means the method for molding fiber-reinforced, thermoplastic polymer composition articles in which substantially all of the fiber-reinforcement and thermoplastic polymer components are not first melt-precompounded in a separate step prior to being fed into the molding apparatus. Typically in direct fabrication of fiber reinforced articles, reinforcement fiber is fed to the molding apparatus in the form of bundles and the thermoplastic polymer is fed in pellet form.

Successful operation according to the process of this invention will produce molded articles having significantly higher heat deflection temperature than obtainable by prior art processes. Heat deflection temperature, as determined by ASTM standard D-648, is the measure of a material's ability to maintain stiffness at elevated temperature. It is considered a critical property for evaluating the suitability of thermoplastic materials for use in high temperature service environments, such as in automotive applications. The use of thermoplastics in automotive applications is becoming evermore extensive. Even an increase in heat deflection temperature of as little as a few degrees centigrade, for example as little as 5° C., can make the difference whether a particular material is suitable for making automotive parts, particularly large automotive parts such as engine compartment parts and body panels.

Thermoplastic polymers suitable for use in the present invention are polyesters and polyamides. Examples of polyesters include polyethylene terephthalate (PET), copolymers of PET and polyethylene isophthalate, cyclohexyl dimethanol/terephthalic acid copolymer, cyclohexyl dimethanol/ethylene glycol/terephthalic acid copolymers, polyethylene 1,4-dicarboxynaphthenate, dicarboxynaphthalate, polybutylene terephthalate, and polycarbonates. Blends of such materials can also be used. A preferred polyester is PET which has an inherent viscosity of from 0.4–1.2 measured in a 3:1 by volume ratio of methylene chloride and trifluoroacetic acid at 30° C. The preferred polyester can contain minor amounts of other comonomers such as diethylene glycol or glutaric acid. Examples of polyamides include conventional semicrystalline nylons such as nylon 6, nylon 66, nylon 69, nylon 610, nylon 612, nylon 11, nylon 12, nylon copolymers such as 6/66, 66/6, 6/610, 6/612, and recently introduced 4/6 and 12/12. Amorphous nylons such as the copolymers of hexamethylene diamine and isophthalic and terephthalic acids, copolyamides containing, in part, aromatic acids such terephthalic acid and diamines such as 2,4,4- and 2,2,4-trimethylhexamethylene diamine, and p-amino cyclohexyl methane and azelaic acid can also be used in this invention. Blends of such materials may be used.

Thermoplastic polymer is employed in particle form. Virgin (i.e., supplied directly by the manufacturer and not recovered by recycling) thermoplastic polymer in any convenient particle shape is acceptable. Typically, polymer particles will be supplied as pellets which may be spheres or right cylinders and will have at least one dimension greater than 2 mm. Recycled thermoplastic polymer, such as recycled bottle resin (RBR) from the recovery of postconsumer soft drink bottles made from PET may also be used. RBR frequently is supplied in the form of small flakes.

The polymer modifier particles may contain an elastomeric toughening agent, a crystallization rate enhancement agent, a viscosity reduction agent and other additives. The modifier typically includes from 10 to 95 wt % thermoplastic polymer which serves to bind the remaining ingredients together sufficiently so that the modifier can be isolated in pellet form. Polymer modifier pellets are produced by conventional melt processing such as, for example, single screw or twin-screw extrusion followed by strand quenching and cutting. Because the thermoplastic polymer is present in the modifier primarily to allow the ingredients to be pelletized, no special intensive mixing need occur in the pelletization step. Alternatively, the polymer modifier may be a regrind resin from molding operations.

Elastomeric toughening agents suitable for inclusion in polymer modifiers of the present invention are those which when finely dispersed within the thermoplastic polymer significantly improves toughness of the thermoplastic polymer. Toughness as used herein is the property measured by notched Izod impact test conducted in accordance with standard ASTM D-256. Elastomers are those polymers which at room temperature can be deformed considerably by application of stress yet will very rapidly recover to substantially original dimension upon removal of the stress causing the deformation. They typically exhibit a glass transition temperature, Tg, below about 20° C. Examples of elastomeric toughening agents include ethylene copolymers wherein ethylene is copolymerized with one or more of such monomers as vinyl acetate, alkyl (meth)acrylate, such as methyl, ethyl, or butyl(meth)acrylates, (meth)acrylic acid, (meth)acrylamide, carbon monoxide, or glycidyl (meth)acrylate. Examples of such ethylene copolymers include ethylene/n-butyl acrylate/carbon monoxide, ethylene/n-butyl acrylate/glycidyl methacrylate, and ethylene/vinyl acetate/carbon monoxide. The ethylene/vinyl acetate and ethylene/(meth)acrylate copolymers may include grafted acid, anhydride or glycidyl groups. Additional ethylene copolymers include ionomers and ethylene/propylene and ethylene/propylene/diene elastomers with or without grafted acid or anhydride groups. Examples of additional elastomeric toughening agents include styrene copolymer-based elastomers such as styrene-ethylene/butylene block copolymers with or without grafted acid, anhydride or glycidyl groups, styrene-butadiene block copolymer, styrene/acrylic ester/acrylonitrile copolymer. Examples of additional elastomeric toughening agents include the block copolyetherester elastomers such as those derived from polymerization of 1,4-butylene terephthalate with poly(tetramethylene ether) glycol terephthalate, such as the copolymers made from 25:75 weight proportion of these monomers.

Polyester crystallization rate enhancement agents suitable for use in the present invention are selected from among sodium or potassium salts of selected hydrocarbon acid or a sodium or potassium salt of a selected organic polymer containing pendant carboxyl groups. PET viscosity reduction agents are selected from among selected low molecular weight organic esters, ketones, sulfones, sulfoxides, nitriles and amides. Such sodium salt, potassium salt, organic esters, ketones, sulfones, sulfoxides, nitriles and amides are disclosed in U.S. Pat. No. Re. 32,334.

Other additives which may be incorporated in the modifier are those which are commonly employed with thermoplastic resins, such as for example, colorants, mold release agents, antioxidants, ultraviolet light stabilizers and flame retardants. Additives which improve physical properties, such as tensile strength and elongation can also be employed, such as for example, epoxy compounds. Illustrative of such physical property improving epoxy compounds is an epoxy compound formed from bisphenol-A and epichlorohydrin.

The steps of this invention are carried out under controlled conditions. One condition is that the hygroscopic ingredients should be dried to remove excessive moisture. Polyester and polyamide are subject to hydrolytic reaction when heated in the presence of water. Hydrolyric reaction rate increases with temperature and water concentration. It can significantly degrade physical properties of these polymers such as impact strength. The process of this invention can be conducted without adverse effect on physical properties provided that water, in excess of the amount which could cause hydrolytic degradation of a predominant fraction of thermoplastic polymer during melt processing at up to about 300° C., is first removed. Preferably, polyester should be dried to less than 0.02 wt % moisture and polyamide should be dried to less than 0.2 wt % moisture. Polymer modifiers, which can contain polyester, polyamide or additional hygroscopic materials, should also be dried prior to melt processing.

Hygroscopic ingredients can be dried at any time during the process prior to exposure of polymer components to temperature substantially above room temperature and preferably to above 60° C. Additionally, once dried, hygroscopic ingredients should be shielded from moisture-containing, ambient atmosphere. Accordingly, all pneumatic conveying air and air with which these components are allowed to contact during transfer, storage and mixing subsequent to drying should be dehumidified to a dew point less than 0° C. Dehumidified pneumatic conveying air is used because the need to maintain contact of dried feed components with dehumidified air is thought to be important.

The term "fiber" is used herein in its broadest sense to include both single and multifilament shaped structures such as, for example, threads, strands, rovings and yarns, wherein the individual filaments are generally oriented lengthwise and may be twisted together, adhered to one another or otherwise made to maintain the integrity of the shaped structure. The term "fiber bundle" sometimes abbreviated to "bundle" herein, denotes continuous fiber that has been cut to discrete particles. Bundles can be cut by chopping, pulverizing as performed in a hammermill, for example, or by any conventional method. When glass fiber bundles are employed, which is usually the case, either complete or partial separation of the bundles into individual fibers normally occurs in the injection molding process, so that the injection molded articles contain predominantly individual glass filaments, rather than fiber bundles, dispersed therein.

Suitable glass fibers are available from many sources, including Pittsburgh Plate Glass Co., (PPG) and Owens-Corning Fiberglass Co. (OCF). The glass fibers may contain a sizing agent which improves adhesion to polymer. The sizing agent may vary with particular glass type or manufacturer but often contains various organotitanates and organosilanes. Representative organotitanates include, for example, tetraisopropyl di(dioctylphosphito) titanate; titanium dimethacrylate oxyacetate; isopropyl diisostearyl methacryl titanate; isopropyl tricumylphenyl titanate; and isopropyl tri(dioctylpyrophosphato) titanate. Representative organosilanes include, for example, 3- aminopropyltriethoxysilane; vinyl triethoxysflane; and 3-chlorpropyltrimethoxysilane.

Glass fiber bundles have uniform length in the range from about 1.5 mm to about 13 mm. Individual glass filament diameter is within the range of 0.5–20 μm. Bundles usually contain from a few hundred to about 2000, especially about 600–1000 of individual glass filaments.

It is important that the ingredients are uniformly mixed in the dry blend prior to melt processing, but that the intensity of mixing not be so great as to break up fiber bundles and form fuzzballs. It has been discovered that if the ingredients can be delivered to the injection molding machine as a uniform dry blend, then melt processing in the molding machinery is sufficient to separate and disperse glass filaments in the matrix polymer so that articles of improved stiffness are produced.

To obtain uniform product composition, each of the components is individually weighed in small portions in contrast to preparation of bulk batches of dry blend composition. Individual ingredient portion sizes are chosen so that the dry blend batch produced by combining portions will have the desired product composition. In order to achieve a thorough mixing of ingredients with minimal disturbance of the fiber component integrity, thermoplastic polymer and polymer modifier are handled differently than the fiber component. Thermoplastic polymer and polymer modifier can be weighed out remotely from the molding machine because they may be transported by conventional means such as pneumatic or vibratory conveying.

Fiber bundles are transported to their supply position above and near the entrance to an injection molding machine with a minimum of agitation of the bundles. Pneumatic conveying of glass fiber bundles is not satisfactory and will result in break up of bundles and the creation of fuzzballs. Portions of glass fiber bundles are weighed and held for mixing with portions of thermoplastic polymer and polymer modifier. Gravity feed or mild vibratory conveying is recommended for transport of glass fiber portions. Transport distances should be kept as short as possible to avoid break up of bundles or fuzzball creation during transfer.

Thermoplastic polymer, polymer modifier and fiber portions are combined for gentle, batchwise mechanical mixing at a location within about 1 m above the feed port of the injection molding machine. Any conventional mechanical mixer capable of mild, stirring or tumbling action is suitable. One skilled in the art will be able to determine upon completion of a limited number of trials the optimum speed and duration of mixing. If the mixing speed is too fast or duration is too long, fiber bundles will break up, fuzzballs will be created, the feed port may become blocked and the product composition will become variable. If mixing speed is too slow or duration is too short, product composition will also become variable and physical properties of molded articles will be inferior.

Injection molding can be accomplished by conventional means employing commercially available equipment.

EXAMPLES

This invention is now illustrated by representative examples of certain preferred embodiments thereof, where all parts, proportions, and percentages are by weight, unless otherwise indicated. All units of weight and measure other than SI units have been converted to SI units.

Example 1

A polymer modifier was prepared from the materials listed and in the concentrations shown in Table 1.

TABLE 1

| Concentration (wt %) | Description |
| --- | --- |
| 6.35 | 76.75 wt % ethylene/28 wt % n-butyl acrylate/ 5.25 wt % glycidyl methacrylate copolymer |
| 38.82 | polyethylene terephthalate having inherent viscosity of about 0.6 |
| 38.82 | ground mica 60 HK (Suzorite Mica Products Inc.) |
| 5.62 | polyethylene glycol ester |
| 7.08 | sodium ionomer of 85 wt % ethylene/15 wt % methacrylic acid copolymer |
| 1.75 | low molecular weight polyethylene wax |
| 1.16 | epoxy compound formed from bisphenol A and epichlorohydrin |
| 0.39 | tetrakis [methylene (3,5-di-tert-butyl-4-hydroxycinnamate)] methane |

Polyethylene terephthalate was first dried to less than 0.02 wt % water then the ingredients were fed to a Werner & Pfleiderer twin-screw extruder operated at a mixture temperature of 290° C. The mixture was extruded as strands, quenched and cut to pellet form.

Each of polyethylene terephthalate flakes obtained from recycled beverage containers (RBR) and the polymer modifier were placed in separate drying hoppers and were dried, by passing heated and dehumidified air through the hoppers, to less than 0.02 wt % water content. They were pneumatically conveyed to separate weigh blender hoppers. Polymer modifier was fed by vibratory feeder to a weigh vessel until 4.54 kg was charged. A second vibratory feeder was used to charge 7.04 kg of RBR flakes to the weigh vessel. The 11.58 kg portion of RBR flakes and polymer modifier was dropped to a transfer system feed hopper and pneumatically conveyed to a receiving hopper located at an elevation of approximately 2 m above the feed port of a Cincinnati Milacron "465 ounce 4000 ton" injection molding machine. All conveying, handling and storage of RBR flakes and polymer modifier was conducted under an atmosphere of air dehumidified to a dew point of at most 0° C.

PPG 3540 (Pittsburgh Plate Glass Company) reinforcement glass fiber bundles, which were 3.18 mm long, were supplied in bulk sacks. By force of gravity, fiber bundles were dropped into a feed hopper from which a 2.04 kg portion was charged by a vibratory feeder to a weigh vessel. The weigh vessel was also elevated about 2 m above the injection molding machine feed port.

The RBR flakes and polymer modifier mixture was dropped into a side port of a Model TM-50, Pacific Engineering Company turbine mixer while the agitator turned at 31 rev./min. The turbine mixer was elevated approximately 1 m above, and located directly over the injection molding machine feed port. The glass fiber bundles were dropped into the turbine mixer through a port on the opposite side. After 15 seconds following addition of glass fiber bundles, the agitator was stopped. When sufficient space had been vacated in the feed hopper of the molding machine, the mixer discharge valve was opened which allowed the entire batch of RBR flakes/modifier/glass fiber bundle dry blend to drop into the hopper. The operation cycle for preparation and feeding dry blend batches was repeated to maintain supply to the injection molding machine.

The injection molding machine was fitted with a 465 ounce (13.2 kg) barrel and a 152.4 mm diameter screw. The screw had a 3.1:1 compression ratio general purpose design and no special dispersive mixing head. The injection molding machine was operated according to the conditions shown in Table 2.

TABLE 2

| CONDITION | EXAMPLE 1 | EXAMPLE 2 |
|---|---|---|
| Screw speed, rev./min. | 50 | 50 |
| Shot weight, kg | 2.8 | 2.8 |
| Molding machine Zone temperature, °C. | | |
| Barrel feed end | 264 | 267 |
| Barrel center 1 | 275 | 274 |
| Barrel center 2 | 272 | 271 |
| Barrel discharge end | 278 | 276 |
| Barrel discharge adapter | 274 | 277 |
| Nozzle | 275 | 282 |
| Mold temperatures, °C. | | |
| Moving section | 110* | 110 |
| Fixed section | 110* | 119 |

*= set temperature

TABLE 2-continued

| CONDITION | EXAMPLE 1 | EXAMPLE 2 |
|---|---|---|
| Molding cycle times, sec | | |
| overall cycle time, sec | 79 | 80 |
| injection, sec | 2.9 | 3.0 |
| pack, sec | 8 | 8 |
| hold, sec | 0 | 0 |
| retraction, sec | 20 | 20 |
| mold cooling, sec | 30 | 30 |

The molding machine was equipped with an automobile headlamp unit mold modified to provide test specimens.

The process was operated continuously through multiple cycles. Test specimens randomly selected from the pooled samples of all cycles were subjected to analyses. Analytical results are presented in Table 3. Flexural modulus stress at break and elongation at break analyses were run according to ASTM standard D-790. Notched izod was determined according to ASTM standard D-256. Heat deflection temperature was measured on samples annealed at 141° C. according to ASTM standard D-648 at 1820 kPa (264 psi).

TABLE 3

| Description | Example 1 | Example 2 |
|---|---|---|
| Ash content, wt % | 33.0 | 35.1 |
| Flexural modulus, MPa | 7412 | 7329 |
| Stress at break, MPa | 67.3 | 68.0 |
| Elongation at break, % | 1.39 | 1.38 |
| Notched Izod, J/m | 57.1 | 62.4 |
| Heat Deflection Temp. °C. | 216 | 208 |

Example 2 (Comparative)

Nominally 3.18 mm long×3.18 mm diameter pellets of RYNITE®935 molding resin available from E. I. du Pont de Nemours & Co., were fed to the same injection molding machine and mold of Example 1. Pellets were dried to less than 0.01 wt % water content prior to feeding. The injection molding machine was continuously operated for multiple cycles at the conditions listed in Table 2. Thereafter test specimens were analyzed. Analytical results are also presented in Table 3.

The data indicate that product of the direct fabrication process according to this invention has significantly improved, higher heat deflection temperature than that produced by conventional processing of commercially available, equivalent feed material. The higher heat deflection temperature of example 1 is achieved with slightly lower glass content than Example 2 as indicated by the ash values. The other physical properties are essentially the same for both processes.

I claim:

1. A process for the direct fabrication of fiber-reinforced injection molded articles having a high heat deflection temperature, comprising:

(1) providing components comprising (A) particles of at least one thermoplastic polymer;

(B) a modifier for said thermoplastic polymer; and (C) inorganic fiber bundles having a fiber length from 1.5 to 13 mm;

(2) drying the thermoplastic polymer and said modifier to a moisture content which prevents hydrolytic degradation of a predominant fraction of the thermoplastic polymer upon exposure to a temperature of up to 300° C.;

(3) maintaining the thermoplastic polymer and modifier in a state of dryness substantially the same as that attained in step (2);

(4) providing separate portions of each of thermoplastic polymer, modifier, and inorganic fiber bundles such that the inorganic fiber bundles comprise from 10 to 60 wt % of the total;

(5) combining the separate portions into a dry blend and blending at such intensity that the inorganic fiber bundles retain their integrity for a sufficient duration to cause the dry blend to have a uniform concentration;

(6) feeding the dry blend to a molding machine; and (7) molding the dry blend to produce molded articles.

2. A process of claim 1 wherein particles of thermoplastic polymer and particles of polymer modifier have at least one dimension which is at least 2 mm.

3. A process of claim 2 wherein the inorganic fiber bundles are glass.

4. A process of claim 3 wherein said modifier comprises an elastomeric toughening agent.

5. A process of claim 3 wherein the thermoplastic polymer is polyester.

6. A process of claim 5 wherein polyester and modifier are dried to a moisture content of less than 0.02 wt %.

7. A process of claim 5 wherein the polyester is polyethylene terephthalate and the polymer modifier further comprises a polyethylene terephthalate crystallization rate enhancement agent.

8. A process of claim 3 wherein the thermoplastic polymer is polyamide.

9. A process of claim 8 wherein polyamide and modifier are dried to a moisture content of less than 0.2 wt %.

10. A product made by the process of claim 1 wherein the thermoplastic polymer is selected from the group consisting of polyester and polyamide.

* * * * *